April 17, 1928. 1,666,208
F. HUBER
MOTOR VEHICLE WITH HORIZONTAL ENGINE
Filed Jan. 22, 1926
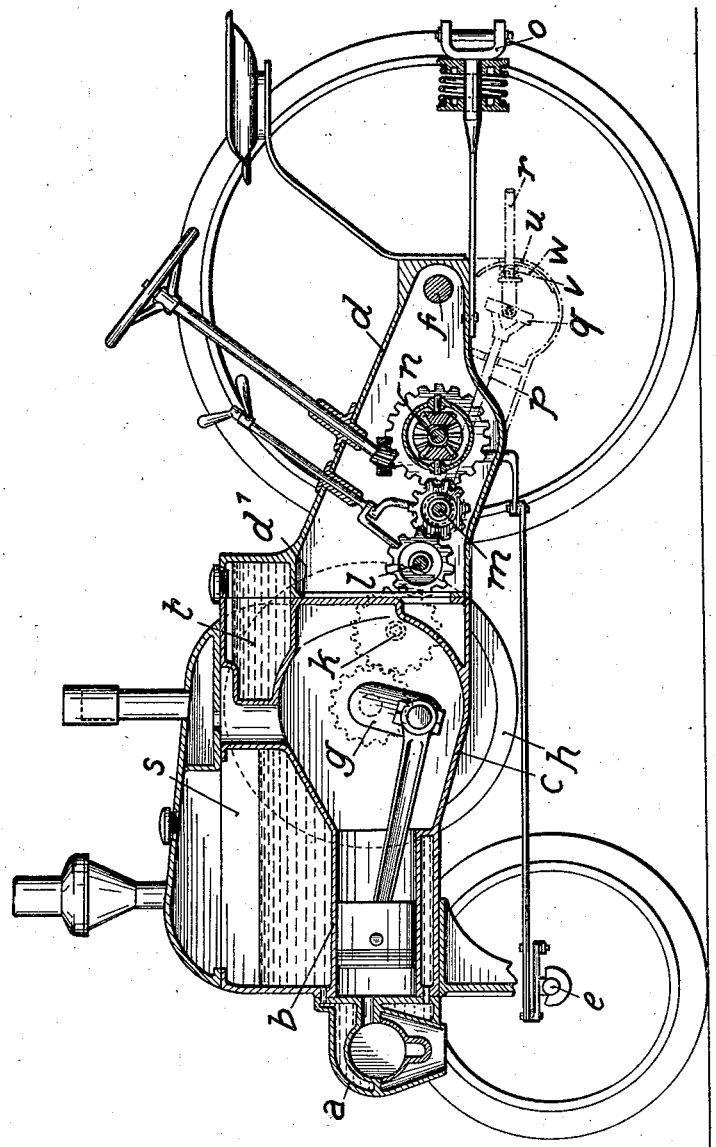
Inventor:
Fritz Huber.
by Wm B. Whitney
Atty.

Patented Apr. 17, 1928.

1,666,208

UNITED STATES PATENT OFFICE.

FRITZ HUBER, OF MANNHEIM, GERMANY, ASSIGNOR TO HEINRICH LANZ AKTIENGE-SELLSCHAFT, OF MANNHEIM, GERMANY, A CORPORATION OF GERMANY.

MOTOR VEHICLE WITH HORIZONTAL ENGINE.

Application filed January 22, 1926, Serial No. 83,058, and in Germany January 23, 1925.

The invention relates to motor vehicles with horizontal engine and attached gear casing and consists in the feature that the cylinder and the crank casing of the engine with the part of the water container supported thereon and a part of the fuel container are manufactured in a single casting and the gear casing which also carries the rear axle is attached to the rear vertical surface of the casting.

A constructional example of the invention is shown in the drawing. $a$ is the cylinder head, $b$ the cylinder and $c$ the crank casing of the horizontal engine. The cylinder $b$, the front end of which rests on the front axle $e$ of the motor vehicle, is manufactured in a single casting together with the crank casing $c$, a part of the container $s$ which serves to hold the cooling water for the cylinder and a part of the container $t$ provided for holding the fuel. To the rear surface of this casting is attached at $d'$ the gear casing $d$ in which the rear axle $f$ of the vehicle is mounted. About in the middle between the axles $e$ and $f$ is located the crank shaft $g$ on which on the two ends are arranged a flywheel $h$ and further a belt pulley coupled with a fly-wheel, not shown in the drawing. In the casing $d$ is arranged the gear of the vehicle whose gear shafts $k$, $l$, $m$ and $n$ are all mounted parallel to the crank shaft $g$ so that the bearing positions of all the shafts $g$, $k$, $l$, $m$ and $n$ and the rear axle $f$ can be bored to a pattern whereby the assembly of the parts can be effected without any special fitting being required. On the rear end of the vehicle is arranged a trailer coupling $o$ in case the vehicle should be required for use as a tractor. If the vehicle is required for use as an agricultural tractor, a shaft $r$ leading to a mowing or other mechanism may be provided. This shaft passes through a slot $u$ of the gear casing and is connected through a universal joint $q$ with a shaft $p$, which obtains its drive, for example, using a pair of bevel gear wheels, from the shaft $m$. The slot $u$ is covered over by a cylindrically bent flange $w$ which is movable on the shaft $r$ against the action of a spring $v$.

By means of the arrangement described the result is obtained that the motor can be manufactured as an independent whole, tested out and used as a stationary engine by itself. In the same way the gear casing may be erected by itself so that after the engine has run in the whole of the assembly work consists merely in the connection of the engine with the gear casing.

I claim:—

1. In a motor vehicle, the combination of a single casting comprising a horizontal internal combustion engine cylinder, a crank casing carrying the crank shaft, part of a cooling water container supported on said cylinder and crank casing, and part of a fuel container supported on said crank casing, said casting having a vertical rear surface, and a casing containing gear mechanism and carrying the rear axle, the vertical front of said gear casing being adapted to be detachably secured to the rear vertical end of said casting.

2. In a motor vehicle, the combination of a single casting comprising therein a horizontal engine cylinder, a crank casing, carrying a crank-shaft, and the major parts of cooling water and fuel supply containers, and a gear casing carrying gear mechanism and the axle of the driven wheels of the vehicle adapted to be rigidly attached directly to the outer end of the crank casing with the gear mechanism operatively connected with the crank-shaft.

3. In a motor vehicle, the combination of a motor unit comprising a horizontal engine, a crank casing carrying a crank-shaft journaled in its opposite sides, and cooling water and fuel supply containers, the engine cylinder and crank casing and parts of the cooling water and fuel supply containers being cast in a single piece having a vertical wall at the outer end of the crank casing, and a gear casing carrying gear mechanism and the axle of the driven wheels of the vehicle adapted to be rigidly attached at its forward end to the vertical wall of said casting and thereby to secure the gear mechanism in operative connection with the crank-shaft.

4. In a motor vehicle, the combination of a front motor unit comprising in a single casting a horizontal engine cylinder, a crank casing carrying a crank-shaft journaled in its opposite sides, and the major portions of cooling water and fuel supply containers located over the engine cylinder and crank casing respectively, and a rear unit comprising a gear casing carrying gear mechanism and the axle of the driven wheels of the vehicle, said units being adapted to be rigidly secured together in a manner to secure the forward end of the gear casing to the rear end of the crank casing and to hold the gear mechanism in operative engagement with a gear driven from the crank-shaft.

In testimony whereof I have hereunto affixed my signature.

Dr. FRITZ HUBER.